US008591318B2

(12) United States Patent
Pfennighausen et al.

(10) Patent No.: US 8,591,318 B2
(45) **Date of Patent: *Nov. 26, 2013**

(54) METHOD AND APPARATUS FOR ENHANCING A WAGERING EXPERIENCE USING A WAGERING TERMINAL ADAPTABLE TO A SELF-SERVICE MODE

(75) Inventors: Scott B. Pfennighausen, San Diego, CA (US); Jim Baker, San Diego, CA (US); Brendan Burgess, Poway, CA (US); Kenneth A. Vlazny, York, PA (US)

(73) Assignee: United Tote Company, Louisville, KY (US)

(*) Notice: Subject to any disclaimer, the term of this patent is extended or adjusted under 35 U.S.C. 154(b) by 640 days.

This patent is subject to a terminal disclaimer.

(21) Appl. No.: 12/778,814

(22) Filed: May 12, 2010

(65) Prior Publication Data

US 2010/0279763 A1 Nov. 4, 2010

Related U.S. Application Data

(62) Division of application No. 11/005,810, filed on Dec. 7, 2004, now Pat. No. 7,762,886.

(51) Int. Cl.
*A63F 9/24* (2006.01)
*A63F 13/00* (2006.01)

(52) U.S. Cl.
USPC .................... 463/25; 463/46; 463/47; 40/530; 40/531; 40/532; 40/533; 361/679.27; 361/679.04; 361/679.05; 361/679.06; 235/6; 235/7 R; 235/29 A; 235/31 A; 235/31 R; 235/31 T; 235/33; 235/383; 345/1.1; 345/1.3; 345/204

(58) Field of Classification Search
USPC .......................... 463/25, 46–47; 40/530–533; 361/679.04–679.06, 679.27; 235/6, 235/7 R, 29, 29 A, 31 R, 31 T, 33, 383; 345/1.1, 1.3, 204
See application file for complete search history.

(56) References Cited

U.S. PATENT DOCUMENTS 5,275,400 A 1/1994 Weingardt et al.
6,001,016 A 12/1999 Walker et al.

(Continued)

FOREIGN PATENT DOCUMENTS

EP 0848846 12/2000
WO 0067215 11/2000

(Continued)

OTHER PUBLICATIONS

International Search Report for International Application No. PCT/US2005/044005 dated Apr. 10, 2006, 3 pages.

(Continued)

*Primary Examiner* — Sunit Pandya
*Assistant Examiner* — Jasson Yoo
(74) *Attorney, Agent, or Firm* — TraskBritt

(57) ABSTRACT

A method and apparatus for use in a wagering environment are disclosed. An exemplary embodiment comprises a wagering terminal including a processor, a memory, a primary display, and a secondary display. The primary display is configured for displaying visual messages. These visual messages are displayed as part of a graphical user interface and include at least one wagering transaction message. The secondary display is configured for displaying additional visual messages associated with the visual messages of the primary display. These additional visual messages are displayed as part of an additional graphical user interface. The wagering terminal may further include a proximity detector configured for detecting the presence of a gaming patron, a user identification unit configured for sampling a unique physical attribute of a user, and an image capture unit configured for capturing at least one image in a vicinity of the wagering terminal.

18 Claims, 9 Drawing Sheets

(56) References Cited

U.S. PATENT DOCUMENTS

| | | | | |
|---|---|---|---|---|
| 6,306,038 | B1 | 10/2001 | Graves et al. | |
| 6,536,658 | B1 | 3/2003 | Rantze | |
| 7,267,613 | B2 | 9/2007 | Cole | |
| 2001/0000636 | A1 | 5/2001 | Weiss | |
| 2001/0003100 | A1 | 6/2001 | Yacenda | |
| 2002/0126110 | A1* | 9/2002 | Bowron | 345/204 |
| 2002/0145039 | A1 | 10/2002 | Carroll | |
| 2002/0147049 | A1 | 10/2002 | Carter | |
| 2002/0151340 | A1 | 10/2002 | Guinn et al. | |
| 2002/0151363 | A1 | 10/2002 | Letovsky et al. | |
| 2002/0173354 | A1 | 11/2002 | Winans et al. | |
| 2003/0054878 | A1* | 3/2003 | Benoy et al. | 463/29 |
| 2003/0073478 | A1 | 4/2003 | Kovacs | |
| 2003/0087701 | A1 | 5/2003 | Paravia et al. | |
| 2003/0092489 | A1 | 5/2003 | Veradej | |
| 2003/0176218 | A1 | 9/2003 | Le May et al. | |
| 2004/0135801 | A1* | 7/2004 | Thompson et al. | 345/702 |

FOREIGN PATENT DOCUMENTS

| | | |
|---|---|---|
| WO | 0222225 | 3/2002 |
| WO | 03073218 | 9/2003 |

OTHER PUBLICATIONS

"American Wagering develops kiosk that offers 24/7 sports betting" www.kioskmarketplace.com/news_printable.htm?id+14189, Nov. 25, 2002, 2 pages.

"Kiosk usage will influence $US77 Billion in sales by 2006". www.iq-l.com/IQL_English/products kiosks.htm, 2 pages.

PCKiosk Company Info, www.pckiosk.com/falls2002/hardware.html, Sep. 3, 2003, 2 pages.

* cited by examiner

METHOD AND APPARATUS FOR ENHANCING A WAGERING EXPERIENCE USING A WAGERING TERMINAL ADAPTABLE TO A SELF-SERVICE MODE

CROSS-REFERENCE TO RELATED APPLICATION

This application is a divisional of U.S. patent application Ser. No. 11/005,810, filed Dec. 7, 2004, now U.S. Pat. No. 7,762,886, issued Jul. 27, 2010, the disclosure of which is hereby incorporated herein by this reference in its entirety.

BACKGROUND OF THE INVENTION

1. Field of the Invention

The present invention relates generally to self-service wagering kiosks and methods for the operation thereof. More particularly, the present invention relates to a method and apparatus for a multiple-mode wagering device wherein a gaming patron's wagering experience is enhanced.

2. State of the Art

In a typical wagering transaction, a gaming patron who desires to place a wager on the outcome of a given event must do so with the assistance of another individual, for instance, a teller at a counter or service window of a racetrack or betting parlor. The wagering environment in such situations generally requires the gaming patron to stand in line with a number of other gaming patrons until such time as they reach the teller and requires them to audibly instruct the teller regarding the wager they wish to place. Due to the proximity of the service window to the other gaming patrons standing in line, many other patrons may overhear the conversations that take place between the gaming patron placing his or her wager and the teller. If the gaming patron is a novice, this environment may be somewhat intimidating and he or she may be uncomfortable asking appropriate questions in the presence, and within earshot, of more experienced patrons. Accordingly, those potential gaming patrons who are relatively unfamiliar with wagering either may place only minimal wagers or forego wagering altogether.

To alleviate the need for a potential gaming patron to interact with a human wager recipient, many wagering establishments (e.g., racetracks and betting parlors) have installed self-service wagering terminals or kiosks. At such wagering kiosks, gaming patrons may, for instance, access information regarding the events on which wagers may be placed, place wagers on desired events, access personal account information, and receive information regarding the outcome of events without the assistance of another individual. Further, the wagering kiosks may provide instructional information regarding how to place a wager thereby aiding the novice gaming patron.

Although these wagering terminals allow the novice to conceal his or her lack of familiarity with the wagering process, they do little to encourage the novice to make wagers. In fact, particularly those individuals who are new to wagering may not even realize that wagering terminals are available in the environment for them to access information and/or place a wager on their own. Further, many wagering terminals offer instruction only in written form on a display screen, rather than graphically, making it difficult for those who have vision impairments or who otherwise have difficulty reading the instructions. In addition, wagering terminals have historically been designed for a single type of wagering transaction, such as lottery ticket sales, or pari-mutuel wagering.

Self-service terminals in the lottery vending environment have not been very successful commercially. The conventional wisdom that tellers are more effective sellers and the expense of implementing new technology needed to enable a self-service environment have made it difficult for lotteries and lottery vendors to justify the expense of upgrading to self-service terminals.

There is a need for a relatively low cost wagering terminal hardware configuration, which may be software reconfigurable for a variety of wagering transactions, such as, lottery ticket sales, and pari-mutuel wagering. In addition, a wagering terminal that may be adapted to both a self-service mode and a teller-assisted mode is desirable. There is a need for a wagering terminal that audibly and visually attracts potential gaming patrons and encourages them to place wagers thereon. Further, a wagering terminal offering audio as well as video instruction, once a gaming patron is engaged, is desirable. Finally, there is a need for a wagering terminal with enhanced security features.

BRIEF SUMMARY OF THE INVENTION

The present invention provides a wagering terminal and method for using the same, for addressing needs not met by conventional wagering terminals.

One exemplary embodiment of the present invention comprises a wagering terminal including a processor, a memory operably coupled to the processor, a primary display operably coupled to the processor, and a secondary display operably coupled to the processor. The primary display is configured for displaying visual messages. These visual messages are displayed as part of a graphical user interface and include at least one wagering transaction message. The secondary display is configured for displaying additional visual messages associated with the visual messages of the primary display. These additional visual messages are displayed as part of an additional graphical user interface.

Another exemplary embodiment of the present invention comprises a wagering terminal including a processor, a memory operably coupled to the processor, a primary display operably coupled to the processor, and a proximity detector operably coupled to the processor. The primary display is configured for displaying visual messages. These visual messages include at least one wagering transaction message. The proximity detector is configured for detecting the presence of a gaming patron in proximity to the wagering terminal.

Another exemplary embodiment of the present invention comprises a wagering terminal including a processor, a memory operably coupled to the processor, a primary display operably coupled to the processor, a secondary display operably coupled to the processor, and a user identification unit operably coupled to the processor. The primary display is configured for displaying visual messages, and these visual messages include at least one wagering transaction message. The secondary display is configured for displaying additional visual messages. These additional visual messages are associated with the visual messages of the primary display. The user identification unit is configured for sampling a unique physical attribute of a user of the wagering terminal.

Another exemplary embodiment of the present invention comprises a wagering terminal including a processor, a memory operably coupled to the processor, a primary display operably coupled to the processor, a secondary display operably coupled to the processor, and an image capture unit operably coupled to the processor. The primary display is configured for displaying visual messages, and these visual messages include at least one wagering transaction message.

The secondary display is configured for displaying additional visual messages. These additional visual messages are associated with the visual messages of the primary display. The image capture unit is configured for capturing at least one image in a vicinity of the wagering terminal.

Another exemplary embodiment of the present invention comprises a method for engaging in a wagering transaction. The method includes providing a wagering terminal configured for a self-service mode and a teller-assisted mode. This wagering terminal comprises a processor, a primary display, and a secondary display. The method further includes configuring the wagering terminal in the self-service mode; the self-service mode configured for enabling a gaming patron to place a wager on the wagering terminal without assistance from a teller. The method further includes engaging in the wagering transaction at the wagering terminal by responding to visual messages displayed on the primary display, wherein the visual messages are configured for prompting the gaming patron for information pertinent to placing a wager.

Another exemplary embodiment of the present invention comprises another method of engaging in a wagering transaction. The method includes providing a wagering terminal configured for a self-service mode and a teller-assisted mode. The wagering terminal comprises a processor, a primary display, and a secondary display. The method further includes configuring the wagering terminal in the teller-assisted mode; the teller-assisted mode configured for enabling a teller to place a wager on the wagering terminal. The method further includes engaging in the wagering transaction at the wagering terminal by a teller responding to visual messages displayed on the primary display, wherein the visual messages are configured for prompting the teller to input information pertinent to placing a wager.

Another exemplary embodiment of the present invention comprises a method of authenticating a user of a wagering terminal. The method includes providing a wagering terminal comprising a processor and a user identification unit. The method further includes sampling a unique physical attribute of a user of the wagering terminal using the user identification unit. The method further includes generating a user unique data element representative of the unique physical attribute and comparing the user unique data element to a user database comprising a plurality of authorized users and at least one user unique database element for each authorized user. The method further includes enabling at least one protected feature on the wagering terminal if the user unique data element matches the at least one user unique database element for one authorized user of the plurality of authorized users.

Another exemplary embodiment of the present invention comprises a method of enhancing a wagering transaction. The method includes providing a wagering terminal comprising a processor, an image capture unit, and a data storage unit. The method further includes detecting an event of interest on the wagering terminal and generating a capture event notification to the image capture unit temporally correlated to the event of interest. The event further includes capturing at least one image in response to the event of interest and storing the at least one image in the data storage unit.

Yet another exemplary embodiment of the present invention comprises another method of enhancing a wagering transaction. The method includes providing a wagering terminal comprising a processor, a primary display, a speaker assembly, and a proximity detector. The method further includes enabling the proximity detector to detect the presence of a gaming patron in an area of proximity to the wagering terminal. The method further includes enabling the primary display to display at least one visual message upon detection of the presence of a gaming patron in proximity to the wagering terminal. The method further includes facilitating the speaker assembly to broadcast at least one audio message upon detection of the presence of a gaming patron in proximity to the wagering terminal.

Another exemplary embodiment of the present invention comprises another method of enhancing a wagering transaction. The method includes providing a wagering terminal comprising a processor, a primary display, a speaker assembly and a proximity detector. The method further includes configuring the wagering terminal to display visual messages on the primary display. The method further includes configuring the wagering terminal to broadcast audio messages through the speaker assembly and configuring the proximity detector to detect the presence of a gaming patron in proximity to the wagering terminal.

Another exemplary embodiment of the present invention comprises a wagering network, including at least one local wagering terminal comprising a processor, a primary display and a proximity detector, and a host system in operable communication with the at least one local wagering terminal. The wagering network further includes at least one remote wagering terminal comprising a processor, a primary display and a proximity detector, and at least one guest system in operable communication with the at least one remote wagering terminal. The wagering network further includes at least one hub in operable communication with the host system and the at least one guest system.

Another exemplary embodiment of the present invention comprises a surveillance system, including at least one local wagering terminal comprising a processor, a primary display, and an image capture unit. The surveillance system further includes a host system in operable communication with the at least one local wagering terminal. The at least one local wagering terminal is configured for capturing at least one image in a vicinity of the wagering terminal.

The apparatus embodiments described above may also include a computer-readable medium, including computer executable instructions, which when executed on the processor, generate a lottery ticket sales environment on the wagering terminal, a pari-mutuel wagering environment on the wagering terminal, or both a lottery ticket sales environment and a pari-mutuel wagering environment on the wagering terminal. Similarly, the method embodiments described above may also include configuring the wagering terminal in at least one operational environment selected from the group consisting of a pari-mutuel wagering environment and a lottery ticket sales environment. In one broad form, the present invention contemplates a wagering terminal that includes computer executable instructions enabling operation of the wagering terminal for pari-mutuel wagering, as well as for lottery wagering, while providing a method of wagering encompassing placing both pari-mutuel wagers and lottery wagers on the same wagering terminal and, optionally, substantially contemporaneously. Either type of wager may be implemented in a teller-assisted mode or self-service mode of the wagering terminal, or one type of wager in one mode and the other type of wager in another mode.

Other features and advantages of the present invention will become apparent to those of ordinary skill in the art through consideration of the ensuing description, the accompanying drawings, and the appended claims.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION OF THE INVENTION

The present invention encompasses a method and apparatus for use in a wagering environment, wherein a gaming patron's wagering experience is enhanced with a self-service mode and a teller-assisted mode of a wagering terminal. The gaming experience and transaction processing may be enhanced by a variety of features such as, multiple display screens, user identification (e.g., biometric identification), image capture technology, proximity detection technology, and audio and visual attraction sequences. The present invention encompasses a method and apparatus wherein an engaged gaming patron may operate the wagering terminal in the self-service mode wherein the patron is provided with audio and visual instruction to facilitate successful placement of a wager on one or more events that may be scheduled to take place at remote event venues. Further, the present invention encompasses a method and apparatus wherein a teller may operate the wagering terminal while the terminal may also provide the patron with audio and visual information about a wager processed by the teller. The particular embodiments described herein are intended in all respects to be illustrative rather than restrictive. Other and further embodiments will become apparent to those of ordinary skill in the art to which the present invention pertains without departing from its scope.

Figure 1:
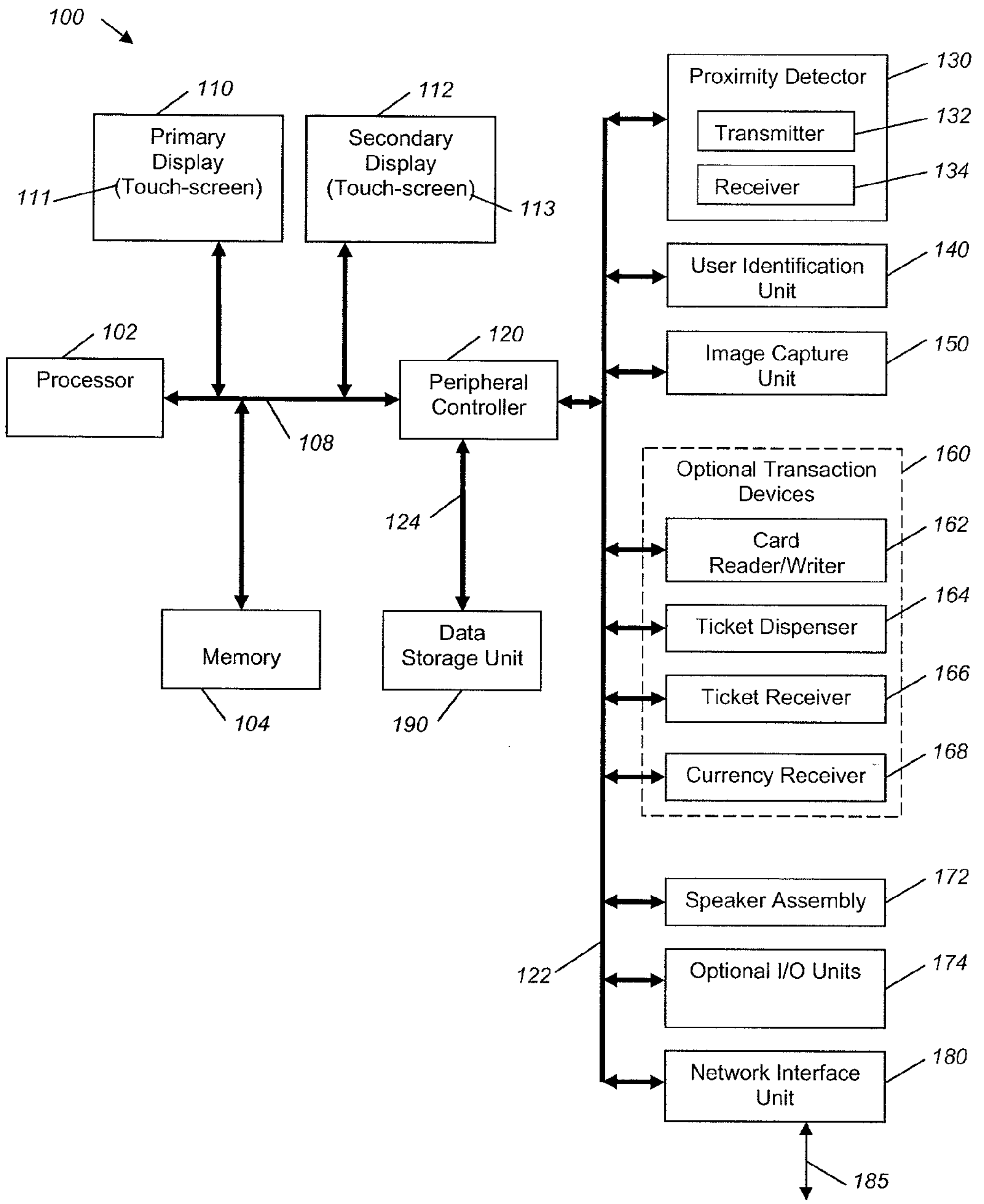
FIG. 1 is a block diagram of a wagering terminal incorporating the features of the present invention.

Referring to the drawings in general, and initially to FIG. 1 in particular, an exemplary wagering terminal 100, such as a kiosk, in accordance with the present invention is shown. Hereinafter, the wagering terminal 100 may also be referred to as a wagering kiosk, but it will be understood and appreciated by those of ordinary skill in the art that the term encompasses other types of wagering terminals 100 including, but not limited to, computer terminals and the like. The wagering terminal 100 includes a processor 102, and a primary display 110. In various combinations, the wagering terminal 100 may also include a secondary display 112, a proximity detector 130, a user identification unit 140, and an image capture unit 150. In addition, the wagering terminal 100 may include a variety of transaction devices 160, a speaker assembly 172, a variety of Input/Output units (I/O units 174), a network interface unit 180, and a data storage unit 190 (also referred to as a computer-readable medium). A memory 104 is operably coupled to the processor 102 to provide operational storage for software (also referred to as computer executable instructions) and data.

In the exemplary embodiment of FIG. 1, the processor 102, the primary display 110, the secondary display 112, the memory 104, and a peripheral controller 120 are all connected to a processor bus 108 for communication. The peripheral controller 120 manages communication with the various other devices via a first peripheral bus 122 and with the data storage unit 190 via a second peripheral bus 124.

It will be readily apparent to a person of ordinary skill in the art that a variety of configurations and organizations of the various elements are possible and within the scope of the present invention. By way of example, and not limitation, the primary display 110 and the secondary display 112 may communicate to the peripheral controller 120 on a private display bus, the first peripheral bus 122, or the second peripheral bus 124. In addition, the system may not have the second peripheral bus 124 and the data storage unit 190 may communicate on the first peripheral bus 122. Other systems may not include a peripheral controller 120. In these other systems, the various elements may communicate directly on the processor bus 108.

The wagering terminal 100 may be coupled to a source of electrical energy or power (not shown), to supply electrical energy to the various components of the wagering terminal 100, as is known to those of ordinary skill in the art. Of course, the wagering terminal 100 may operate on battery power.

Figure 2A:
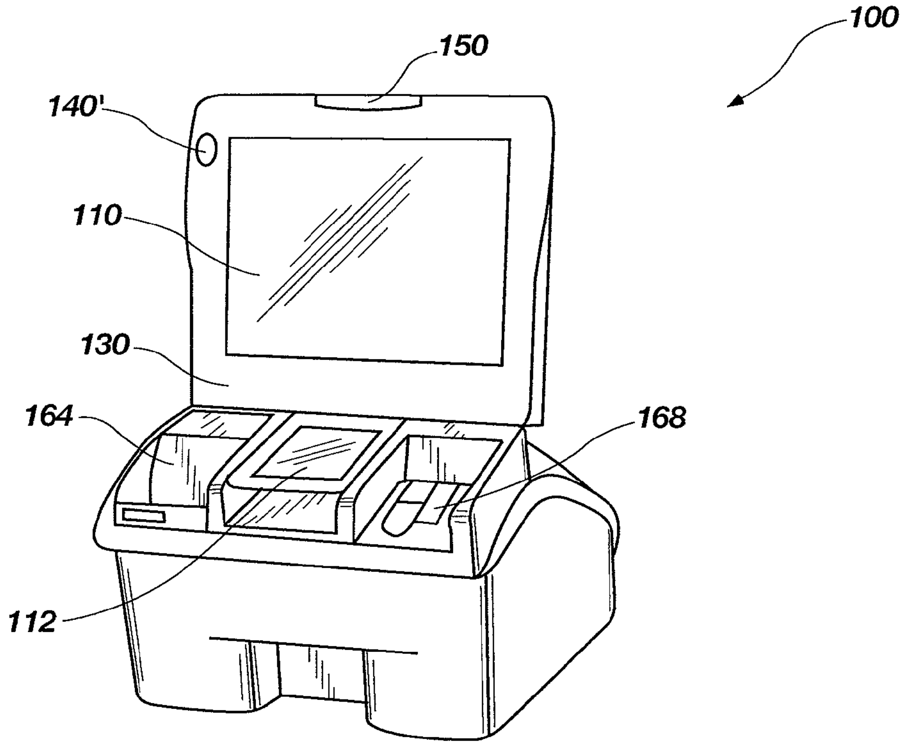
FIG. 2A is a perspective view of a wagering terminal, from a patron perspective and in a self-service mode, incorporating the features of the present invention.
Figure 2B:
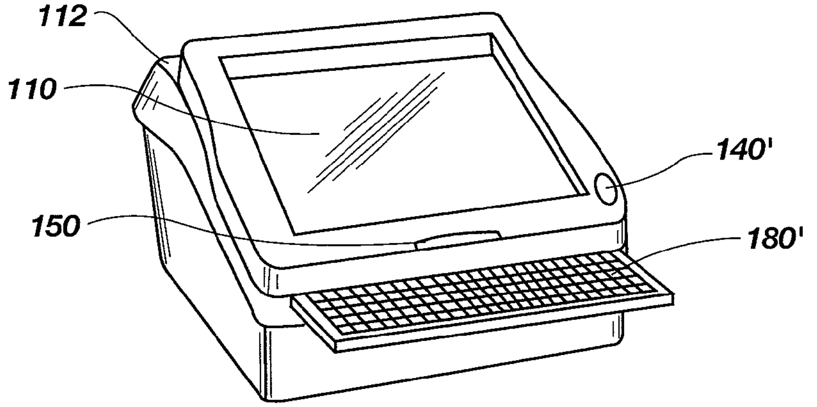
FIG. 2B is a perspective view of a wagering terminal, from a teller perspective and in a teller-assisted mode, incorporating the features of the present invention.

As shown in FIGS. 2A and 2B, the wagering terminal 100 may be a terminal type device configured for placement on a flat surface such as a tabletop. In addition, it will be understood and appreciated by those of ordinary skill in the art that the wagering terminal 100 of the present invention may be embodied in other configurations including, but not limited to, a wall mount configuration or a stand-alone unit that includes a freestanding housing of any suitable size and shape.

Returning to FIG. 1, exemplary devices for the processor 102 may be any of a variety of microprocessors, microcontrollers, or digital signal processors, suitable for running software programs and controlling the various peripheral devices. In addition, the processor 102 may include other devices and functions for implementation of cache memory, graphics control, and memory control, as a few examples.

The data storage unit 190 may be a device, such as, for example, a hard disk drive, a floppy disk drive, Flash memory, Compact DISC drive, Digital Video Device drive, or any combination thereof.

The memory 104 may be a device, or combination of devices, such as, for example, Dynamic Random Access Memory (DRAM), Static Random Access Memory (SRAM), Read-Only Memory ROM, and Flash memory.

The primary display 110 may be any one of numerous known tube (e.g., cathode-ray tube (CRT)), plasma, or liquid crystal display (LCD) monitors and is provided to display various visual messages. For example, the primary display 110 may provide visual instructional information associated with a wagering transaction, as well as venue and product advertisements and promotions, gaming patron profile information, visual attraction sequences, wagering transaction information, and the like. If desired, a predetermined area of the primary display 110 may be dedicated for display of custom programming (e.g., advertisements, promotions, and the like) typically established at a local system level, as more fully described below.

The exemplary embodiment shown in FIGS. 2A and 2B incorporates touch screen technology (referred to as a primary touch screen 111 in FIG. 1), as known to those of ordinary skill in the art, such that when a gaming patron touches a predetermined area of the primary touch screen 111, signals are generated and communicated to the processor 102. Such a configuration enables the primary touch screen 111 to function as a data input device, thereby enabling interactive operation of the wagering terminal 100. It may operate as a data input device for the gaming patron, in self-service mode, or for the teller, in teller-assisted mode, as is explained more fully below. Alternatively, the wagering terminal 100 of the present invention may include an optional I/O unit for data input such as a keyboard 180' (shown in FIG. 2B), a mouse (not shown), or microphone (not shown) for accepting audio commands.

In the exemplary embodiment shown in FIGS. 2A and 2B, the primary display 110 is a flat-panel type device and is attached to the wagering terminal 100 enclosure via a hinge assembly (not shown). FIG. 2A is a perspective view of the wagering terminal 100 from a patron perspective and in a self-service mode. FIG. 2B is a perspective view of the wagering terminal 100, from a teller perspective and in a teller-assisted mode. The hinge assembly allows the wagering terminal 100 to be adapted to the self-service mode, wherein the primary display 110 is substantially upright for presentation of the image to a gaming patron (as shown in FIG. 2A), or in teller mode, wherein the primary display 110 is folded down for display to a teller (as shown in FIG. 2B). The hinge assembly may be detented to provide optimal user viewing positions and rigidity in both the self-service mode and the teller-assisted mode. The patron perspective of FIG. 2B shows a first side (i.e., front side) of the wagering terminal 100 with the secondary display 112 and upright primary display 110 facing the same general direction toward the patron perspective. The teller perspective 102 of FIG. 2B shows a second side (i.e., back side) of the wagering terminal 100 with the secondary display 112 hidden from view and the folded down primary display 110 facing toward the teller perspective.

The primary display 110 may be configured to display information in a mode such as a graphical user interface. The graphical user interface may be combined with the primary touch screen 111 to generate, in software, reconfigurable and selectable elements, such as, for example, lists of available races to wager on, lists of horses available for a given race, and alpha numeric keys for data entry in applications ranging from pari-mutuel betting to lottery ticket number entry and purchase. A number of other user features and options will be readily apparent to a person of ordinary skill in the art and encompassed by the scope of the present invention.

The secondary display 112, as shown in FIG. 2A, faces the patron in both self-service mode and teller-assisted mode. In teller mode, the secondary display 112 may be used to display the progress of transaction input by the teller, for the benefit of the patron. For example, it may be used to develop an image of the wagering slip, display a wagering establishment logo, and display promotional messages.

In addition, the exemplary embodiment of the secondary display 112 includes a secondary touch screen 113 (shown in FIG. 1). The secondary touch screen 113 may be used for a variety of functions, such as, for example, allowing the patron to enter a personal identification number, prompt the patron to insert currency into a currency receiver 168, and capture a patron's signature. As with the primary touch screen 111, the secondary touch screen 113 may be implemented with a variety of touch screen technologies well known to a person of ordinary skill in the art.

In addition, the secondary display 112 may be configured to display information in a mode such as an additional graphical user interface. The additional graphical user interface for the secondary display 112 may be combined with the touch screen to generate, in software, reconfigurable and selectable elements, such as, those suggested for the primary display 110. In addition, when in teller-assisted mode, the additional graphical user interface of the secondary display 112 may illustrate, for the patron, much of the same information shown to the teller using the graphical user interface of the primary display 110.

The proximity detector 130 of the wagering terminal 100 comprises a transmitter 132 and a detector or receiver 134 (both shown in FIG. 1). The transmitter 132 may be any one of numerous known transmitters 132 that are configured to emit various types of radiation, including, but not limited to, electromagnetic, sound, elastic, or particulate, at various frequencies. In the exemplary embodiment, the transmitter 132 is an infrared transmitter. The transmitter 132 may be provided to transmit or emit radiation that may reflect from a potential user (e.g., a potential gaming patron) in proximity to the wagering terminal 100.

The receiver 134 may be any one of numerous known detectors, sensors, or transducers that are configured to receive or detect the type of radiation emitted by the transmitter 132. Accordingly, the receiver 134 of the exemplary embodiment is an infrared detector 134 provided to receive radiation that is reflected from a potential user in proximity to the wagering terminal 100. Infrared transmitters 132 and detectors 134 are known to those of ordinary skill in the art and are available from a variety of sources, such as Sharp Electronics Corporation of Mahwah, N.J.

The wagering terminal 100 may include a low power consumption mode, as is known to those of ordinary skill in the art. When in the low power consumption mode, no audio messages are broadcast through the speaker assembly 172 and a visibly moving visual image may or may not be displayed on the primary display 110, the secondary display 112, or both displays. The low power consumption mode may be initiated when the receiver 134 has not detected the presence of a potential gaming patron in proximity to the wagering terminal 100 for a predetermined period of time. The low power consumption mode may extend the life of the wagering terminal 100 in addition to saving energy and is particularly valuable for battery-operated terminals. The low power consumption mode also alleviates the need for personnel to switch off the power supply to the wagering terminal 100 when not in use, for instance, at the end of the day.

If the wagering terminal 100 is in the low power consumption mode and the transmitter 132 emits radiation that is reflected from a potential gaming patron and detected by the receiver 134, a signal may be transmitted to the processor 102 and the processor 102 may cause the wagering terminal 100 to come out of a low power consumption mode and substantially simultaneously cause audio and visual attraction sequences to be initiated to entice the potential gaming patron to the wagering terminal 100. Conversely, if the receiver 134 has not detected the reflection of radiation from a potential user for a predetermined period of time, the processor 102 may place the wagering terminal 100 in a low power consumption mode. The wagering terminal 100 may then remain dormant, excepting the proximity detector 130, and other necessary functions until such time as reflected radiation is again detected by the receiver 134.

It will be understood and appreciated by those of ordinary skill in the art that the proximity detector 130 of the present invention may also be utilized as a communications saving device in that the wagering terminal 100, while not connected to a network at all times, as more fully described below, may begin to reestablish a network connection (e.g., via dialup or other method) upon detection of a potential gaming patron's approach. This may have the added benefit of minimizing communications costs.

An ability to implement enhanced security measures is a significant aspect of the present invention. To support these enhanced security measures, some embodiments of the present invention may include a user identification unit 140. The user identification unit 140 may be used to capture information biometric (i.e., unique physical attributes of the user) about a user. In the presently preferred embodiment, the user identification unit 140 is a fingerprint reader 140' for use in teller-assisted mode to identify an authorized teller. The fingerprint reader 140' may be used as an identification aid for teller sign-on to the wagering terminal 100. In an exemplary embodiment, the fingerprint reader 140' includes a small sensor, which reads characteristics of a fingerprint. The wagering terminal 100 may store these characteristics (also referred to as a user unique data element) in a local or a remote user database. The characteristics may be compared to the user database of authorized fingerprint characteristics to verify that the teller may sign-on. The fingerprint reader 140' may also be used in conjunction with a secondary identifier, such as, for example, an employee number entered on the primary touch screen 111 or keyboard 180' a personal identification number, or an identification card read by a card reader/writer 162 (FIG. 1). With a secondary identifier, there is no need for a search engine to find the characteristics of a given fingerprint. Instead, the secondary identifier may be used as a pointer to an entry in the user database. The fingerprint characteristics for that user database entry may then be compared to the fingerprint characteristics from the fingerprint reader 140'. Once the user is identified and verified as an authorized user, the wagering terminal 100 may enable additional protected features, which should only be available to authorized users.

In addition, if desired, some wagering terminals 100 may be configured for the finger print reader to be used in self-service mode. This may provide additional security during various sensitive or secure monetary transactions.

It will be readily apparent to a person of ordinary skill in the art that other user identification units 140 may be used. For example, the image capture unit 150, explained below, may be used in conjunction with facial recognition software for user identification. The primary touch screen 111 or secondary touch screen 113 may be used to capture a signature, which may be compared to signatures stored in a database. A microphone may be implemented as an optional I/O unit, and used, in conjunction with voice recognition software for user identification.

The image capture unit 150 may be included in the wagering terminal 100. In the exemplary embodiment shown in FIGS. 2A and 2B, the image capture unit 150 is located centrally (above the primary display 110 in the self-service mode of FIG. 2A, or below the primary display 110 in the teller-assisted mode of FIG. 2B). This configuration enables the image capture unit 150 to capture important images (such as a user's face) in the vicinity of the wagering terminal 100. Of course, other locations may be desirable and would be encompassed within the scope of the present invention.

In the exemplary embodiment, a Charge Coupled Device (CCD) image sensor is implemented. However, other image capture devices, such as, for example, Complementary Metal Oxide Semiconductor (CMOS) sensors may be used.

The image capture unit 150, in conjunction with the processor 102, the data storage unit 190, and the network interface unit 180 may be used to implement a system that captures still images substantially at the time that any event of interest is triggered by the processor 102, the proximity detector 130, or other optional I/O units 174. The still images may be stored on the data storage unit 190 or may be transmitted through a network interface 185 (FIG. 1) to a remote device for storage or analysis.

In addition to still images, the image capture unit 150 may be configured to capture video images. In other words, a series of still images captured at a predefined frame rate. The frame rate may be set at a rate of, for example, the standards of 24 or 30 frames per second to optimize for capturing motion. Alternatively, the frame rate may be set much slower, such as for example, one or less frames per second, to optimize the amount of data that is stored or communicated through the network interface unit 180. In a video capture mode, the wagering terminal 100 may be set to begin capturing video frames at the occurrence of an event of interest as explained above for the still image capture mode. As examples not intended to limit the scope of the present invention, some possible events of interest may be detection of a patron by the proximity detector 130, initiation of a transaction, completion of a transaction, sign-in of a teller, attempted tampering with the wagering terminal 100, and general periodic events at predetermined times.

The video capture mode may also be configured to continually capture video frames, which are stored in a circular buffer, either remotely or on the data storage unit 190. A circular buffer may store a predetermined number of frames, when the buffer is full, the next new frame replaces the oldest frame in the buffer. In the circular buffer mode, the event of interest may stop image capturing or may allow a predetermined number of frames to be captured after the event of interest. This mode may be useful for creating a video that has captured images before, during, and after the event of interest.

As with the user identification unit 140, the image capture unit 150 may be used for a variety of security measures. Facial recognition was identified above as one such use. Additionally, the image capture unit 150 may be used much like an automated teller machine to capture an image of the patron, or teller, presently using the machine, as well as the background area in the vicinity of the wagering terminal 100.

Furthermore, the wagering terminal 100 may be used in conjunction with other wagering terminals 100; strategic placement of the wagering terminals 100 would create a video surveillance system for an establishment. When connected in a network configuration, the video surveillance system may capture and store a wide range of images across predetermined time spans to be used for real time and stored video surveillance.

The wagering terminal 100 of the present invention may further include a variety of optional transaction devices 160. A card reader/writer 162 may be one such device. The card reader/writer 162 may be any electronic (e.g., smart card) or magnetic strip reader/writer known to those of ordinary skill in the art. In one embodiment, an account card may be issued to the gaming patron at a casino, racetrack, betting parlor, or the like which houses at least one wagering terminal 100 of the present invention. The account card may be encoded with information identifying the gaming patron and/or the gaming patron's corresponding wagering account. Use of an account card may be encouraged as it also facilitates player tracking.

Upon initiation of a gaming transaction, as more fully described below, the gaming patron may swipe or insert the card into the card reader/writer 162 to facilitate identity verification and/or provide access to the gaming patron's wagering account. Such actions serve to expedite the wagering process. Further, in the event that the gaming patron engages in a winning wagering transaction, the winning funds may be added to the gaming patron's wagering account by swiping the patron's account card through the card reader/writer 162. Additionally, where government regulations permit, the card reader/writer 162 may permit a gaming patron to add funds to a pre-established wagering account, or supply funds for a single transaction, by swiping his or her debit card or credit card through the card reader/writer 162.

Upon swiping of, for instance, an account card, the wagering terminal 100 may access identity and/or wagering account information associated with the swiped card from the memory 104, a network 200, or the data storage unit 190. The wagering terminal 100 may be configured to show relevant information from the swiped card on the primary display 110 or the secondary display 112. If desired, the wagering terminal 100 may also broadcast the relevant information through the speaker assembly 172.

Another possible transaction device of the present invention is the currency receiver 168 as is well known to a person of ordinary skill in the art. As will be appreciated, the card reader/writer 162 and the currency receiver 168 provide alternative mechanisms for crediting a gaming patron's wagering account or funding a wagering transaction.

The wagering terminal 100 of the present invention may also include a ticket dispenser 164 and ticket receiver 166 (both shown in FIG. 1). The ticket dispenser 164 is coupled to a printer (not shown), e.g., a thermal ticket printer, internal to the wagering terminal 100. The ticket printer (not shown) prints a ticket having information confirming the details of a wagering transaction, venue and/or product advertisements or promotions, and other desired messages thereon and the ticket dispenser 164 dispenses the ticket.

Upon completion of the event on which a wager was placed, the gaming patron may insert the ticket into the ticket receiver 166 for determination of whether the wagering transaction was a winning wagering transaction. By way of example, and not limitation, the ticket receiver 166 may be an optical mark reader, laser scanner, or charge-coupled device (CCD) scanner. Additionally, and by way of example and not limitation, the ticket receiver 166 may be configured to read Hollerith code tickets and Code 39 tickets. Such codes are well known in the art. Valid tickets may be thermally branded and retained by the ticket receiver 166, and the wagering terminal 100 may credit the patron's account as explained below. Other tickets, not retained by the ticket receiver 166, are returned to the patron.

The speaker assembly 172 of the wagering terminal 100 may include one or more speakers (e.g., stereo speakers) known to those of ordinary skill in the art and configured for use with the wagering terminal 100. The speaker assembly 172 may be provided to broadcast various audio messages such as attraction sequences, instructional information, venue and product advertisements and promotions, and the like. By way of example, and not limitation, the speaker assembly 172 may be utilized to broadcast attraction sequences to potential gaming patrons detected in proximity to the wagering terminal 100 and/or audio instructions to a gaming patron engaged at the wagering terminal 100 regarding the current wagering transaction.

Other optional I/O units 174 not already explained, may include devices such as serial port controllers, parallel port controllers, Universal Serial Bus (USB) controllers, infrared communication controllers, and the like.

Figure 3:
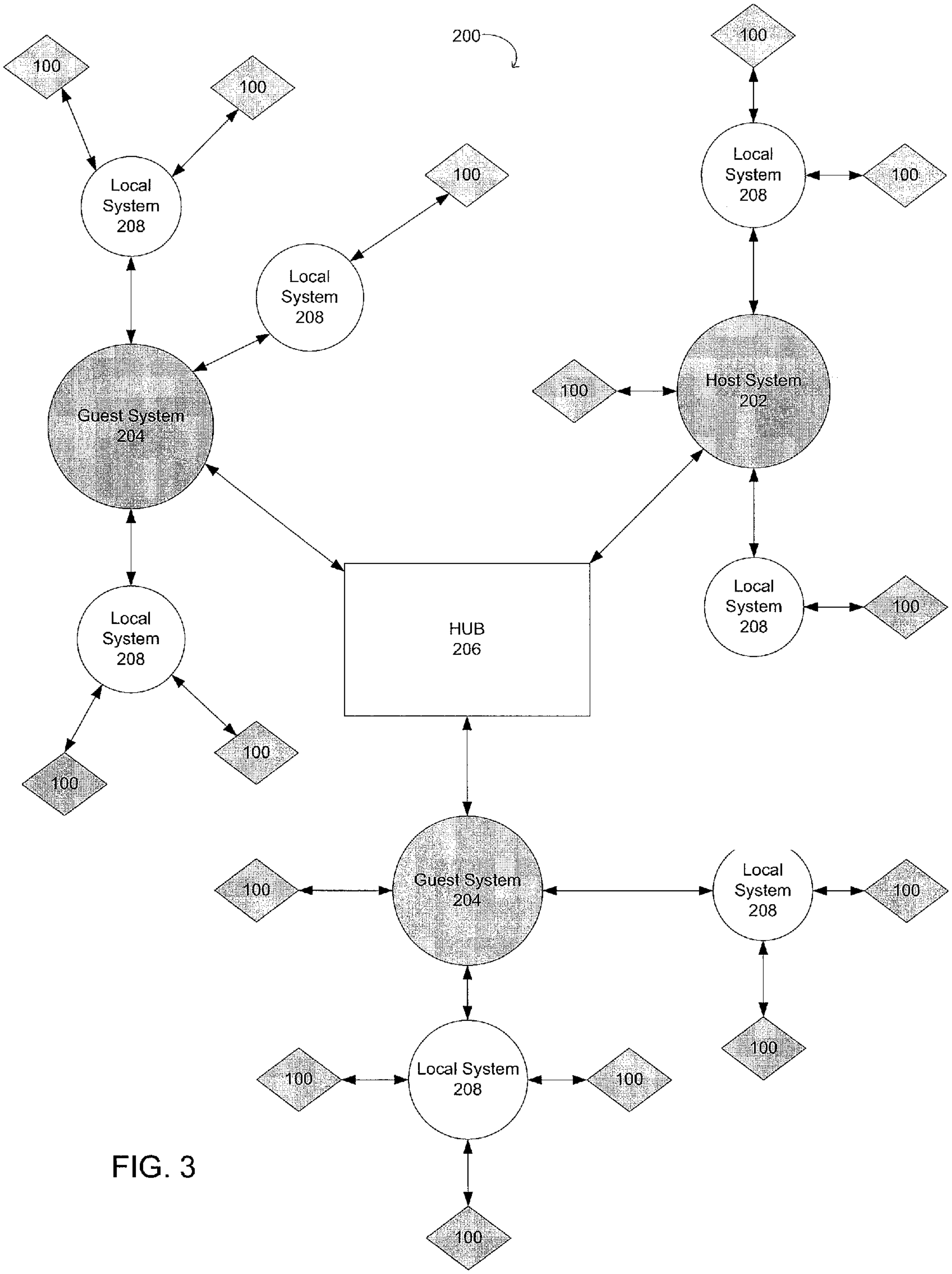
FIG. 3 is a simplified block diagram illustrating the wagering terminal of FIG. 1 as part of a network of related systems.
Figure 4A:
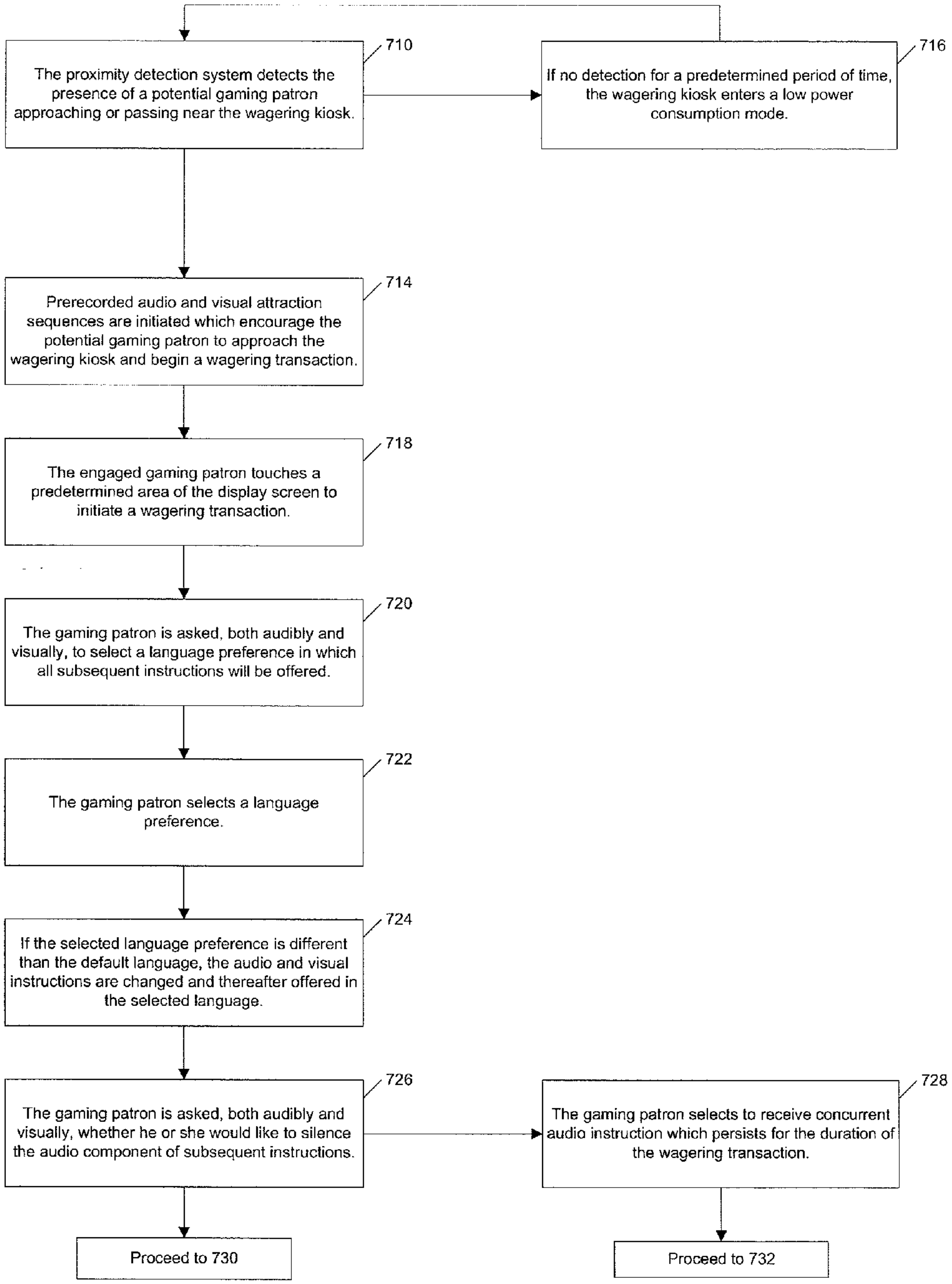
FIGS. 4A-4E are flow diagrams illustrating exemplary wagering transactions that may be conducted utilizing the wagering terminal and network of related systems of the present invention.
Figure 4B:
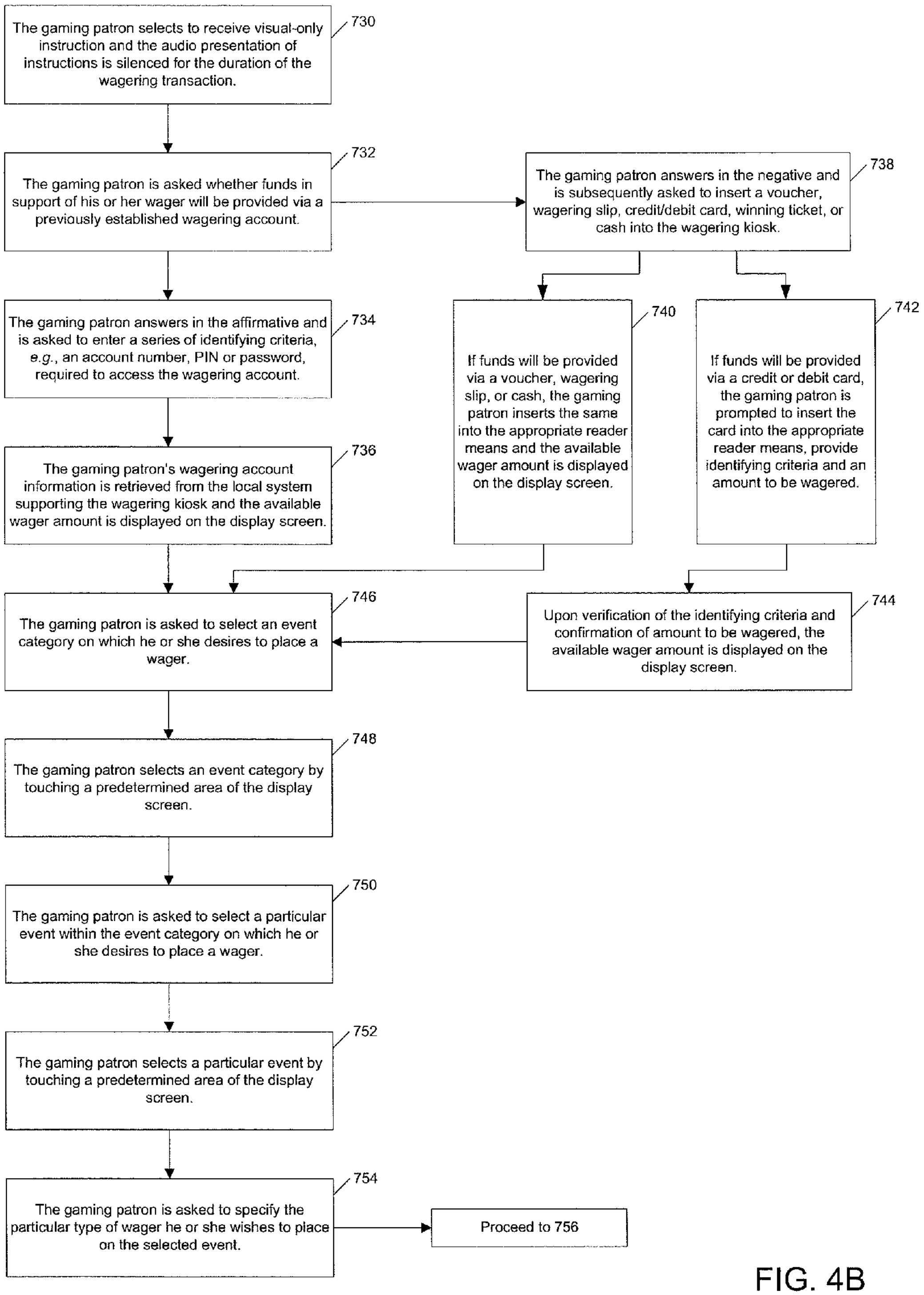
Figure 4C:
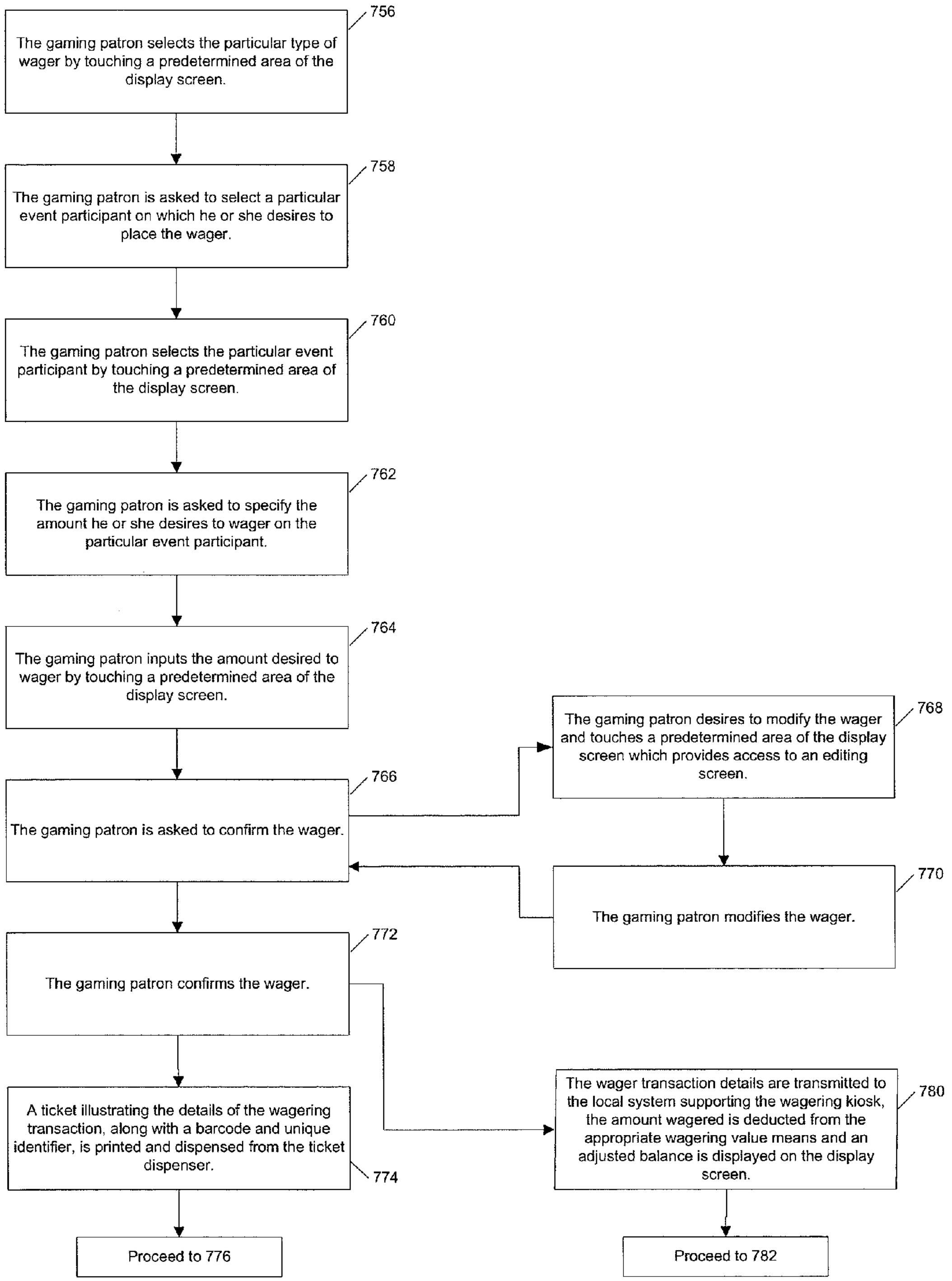
Figure 4D:
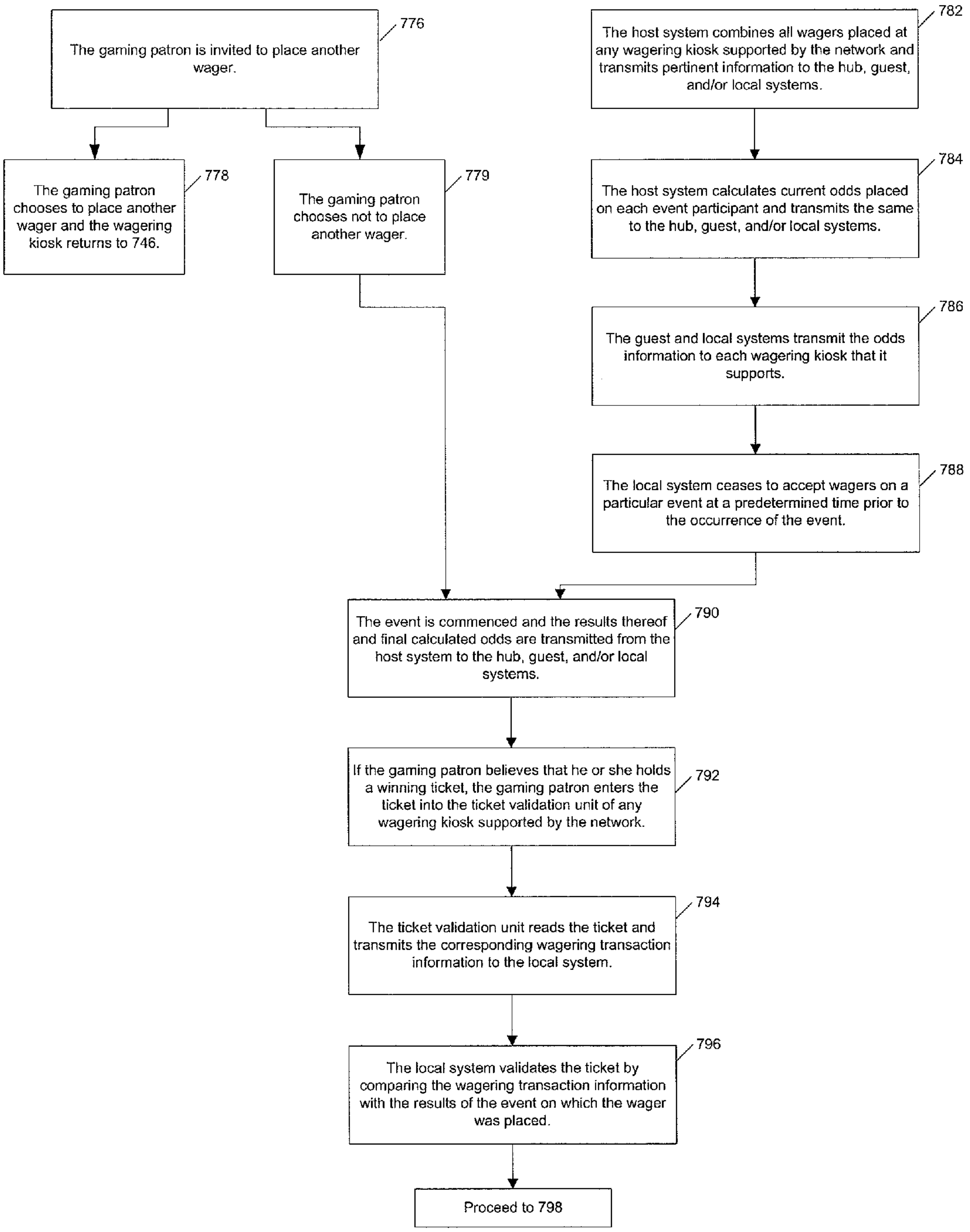
Figure 4E:
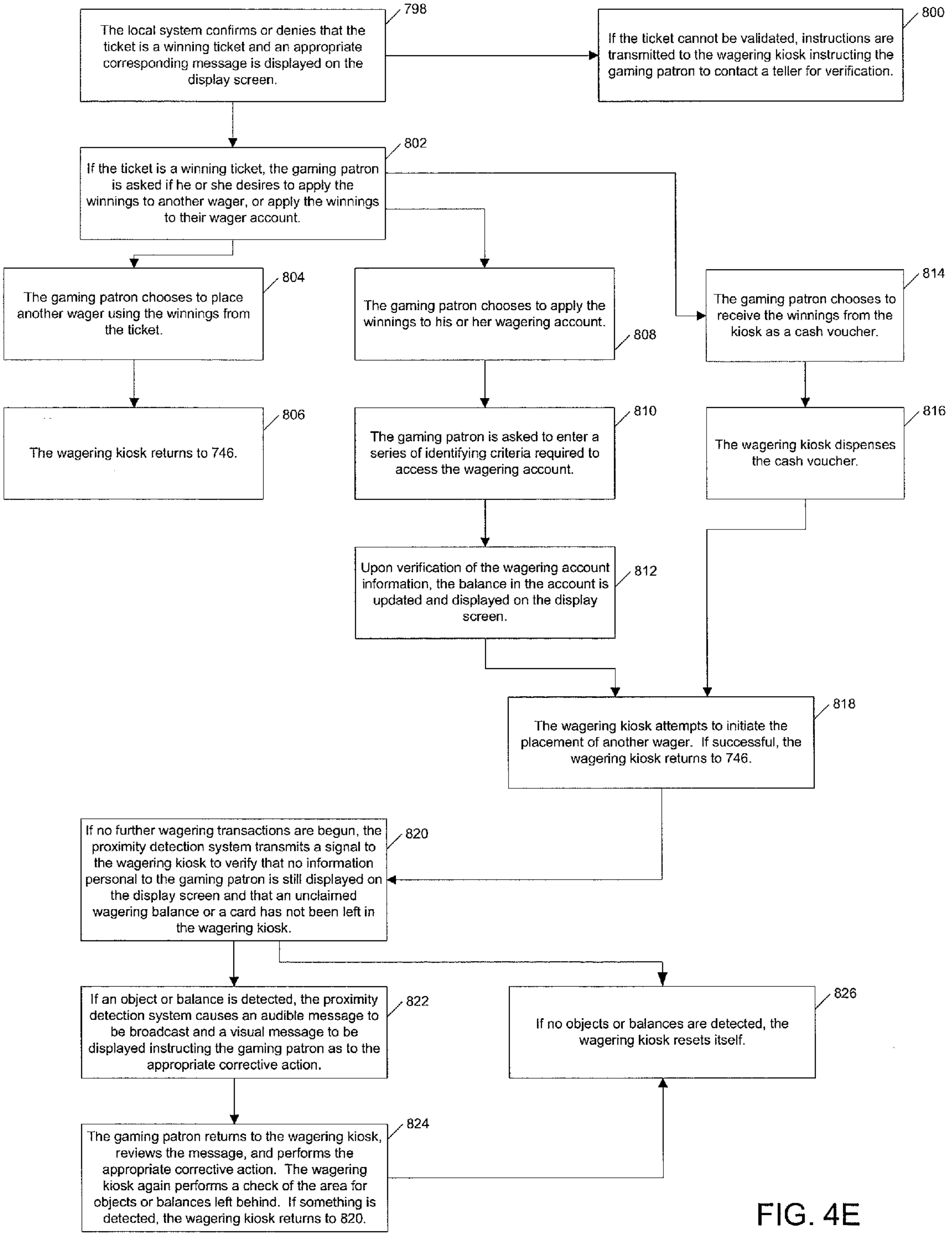

The wagering terminal 100 may be further configured with the network interface unit 180 for communication to other devices in a network environment (e.g., local, guest, hub, and host systems). By way of example, and not limitation, some possible networks 200 (FIG. 3) well known in the art are Ethernet, 802.11b/a/g, BLUETOOTH® and power line modulation (such as Home-Plug). It will be understood and appreciated by those of ordinary skill in the art that the present invention is not limited by the communication media utilized.

Figure 5:
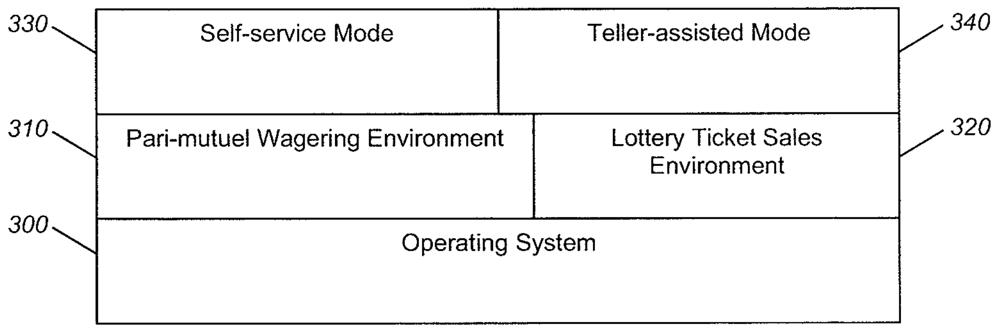
FIG. 5 is a software architecture diagram illustrating exemplary operational environments and exemplary operating modes.

The wagering terminal 100 is configured with a flexible hardware structure. This flexibility enables easy maintenance by enabling replacement or upgrade of the various hardware modules. In addition, the hardware structure enables the use of widely accepted conventional operating systems and software environments. These conventional software environments enable simple replacement or upgrade of the software controlling the wagering terminal 100. FIG. 5 is an exemplary software architecture diagram illustrating an operating system 300 and a basic structure of exemplary operational environments and exemplary operating modes. A person of ordinary skill in the art will recognize that FIG. 5 is a simple example of a software architecture for showing these operational environments and is not intended to illustrate the entire software architecture of the wagering terminal 100.

Within this software environment, the wagering terminal 100 may be reconfigured for operation in a variety of operational modes. By way of example, and not limitation, and as explained earlier, the wagering terminal 100 may be configured for use in a self-service mode 330 and a teller-assisted mode 340. The change between self-service mode 330 and teller-assisted mode 340 may be effected by a command from an authorized user with special software execution privileges. However, the change may be as simple as moving the primary display to the substantially upright position to operate in the self-service mode 330 and moving the primary display to the substantially closed position to operate in the teller-assisted mode 340.

In addition, the wagering terminal 100 may be configured for different operating environments. By way of example, and not limitation, the wagering terminal 100 may be configured to operate in a pari-mutuel wagering environment 310 or a lottery ticket sales environment 320. In the presently preferred embodiment, a change between the pari-mutuel wagering environment 310 and the lottery ticket sales environment 320 may be enabled by a command from an authorized user with special software execution privileges. Furthermore, if the wagering terminal 100 is physically installed in a location where only one environment will be operational, only software needed to support that operational environment need be installed on the data storage-unit unit 190.

In addition, the relatively low cost and flexibility of the wagering terminal 100 may make a wagering terminal 100, which is adaptable to self-service mode 330 and teller-assisted mode 340, in a lottery ticket sales environment 320 less expensive than conventional teller only lottery terminals, while including the added benefit of self-service mode features such as the card reader/writer 162, and currency receiver 168. Furthermore, the ability to flip the primary display 110 from the substantially closed position to the substantially upright position to reconfigure the wagering terminal 100 from the teller-assisted mode 340 to the self-service mode 330 is an added benefit in the lottery ticket sales environment 320. Depending on the workload of a teller (or sales clerk), or assistance needed by a patron, the wagering terminal 100 may be easily reconfigured from one mode to the other. Thus, wagering terminal 100 may be reconfigured to the self-service mode 330 for use during periods where there is not sufficient patron traffic to justify the cost of having a teller or sales clerk on duty, so that patrons in the vicinity may place a wager in the form of a lottery ticket purchase. In addition, placement of wagering terminal 100 configured in the self-service mode 330 in certain environments, such as retail environments, may enable capturing of impulse wagers in the form of lottery ticket purchases by patrons who are on the premises for other purposes.

While most of the description herein is directed toward the pari-mutuel wagering environment 310, it will be readily apparent to a person of ordinary skill in the art that the hardware configuration enables operation in the lottery ticket sales environment 320 with modifications to the software controlling the GUI and primary touch screen 111 of the primary display 110, and, if desired, the secondary display 112 (FIG. 1), as well as other software dedicated to supporting the lottery ticket sales environment 320.

Furthermore, the flexible software configuration enables substantially contemporaneous access to the pari-mutuel wagering environment 310 and the lottery ticket sales environment 320, wherein either environment may operate in the teller-assisted mode 340 and the self-service mode 330. Also contemplated within the scope of the present invention is that the software may be configured such that the lottery ticket sales, rather than being implemented as an alternate software environment, may be implemented as a subset of the pari-mutuel wagering environment 310. For example, it may be desirable to enable both pari-mutuel wagering and lottery wagering from a single GUI screen. An exemplary, and not limiting, implementation may be to enable lottery ticket sales at a specific area of the GUI in the pari-mutuel wagering environment 310, or as a separate GUI widow for lottery ticket sales, which may be called up within the pari-mutuel wagering environment 310. Of course, this exemplary implementation may also be configured to operate in both self-service mode 330 and teller-assisted mode 340.

The present invention further provides a system wherein a plurality of wagering terminals 100 may be operably coupled to one another, and to one or more off-site wagering venues, through the network 200, such that wagering on a single event may be facilitated at a number of different locations, each remote from one another. Thus, multiple types of wagers may be placed on multiple events scheduled to occur at multiple event venues from a single wagering terminal 100. An exemplary embodiment of the system of the present invention is shown in the simplified block diagram of FIG. 3. In addition to a plurality of wagering terminals 100, the currently preferred embodiment of the network 200 of the present invention includes a host system 202, at least one guest system 204, at least one hub 206, and optionally, at least one local system 208.

The host system 202 is typically a system that is located at the facility at which the event on which a gaming patron wishes to place a wager is scheduled to take place. For instance, if the event on which a gaming patron wishes to wager is a horse race scheduled to take place at Santa Anita Park in Arcadia, Calif., a system located at Santa Anita Park is the host system 202. The host system 202 may be configured to transmit data (e.g., wagering event information) through the network 200 to each wagering terminal 100 associated therewith at predetermined time intervals. Further, the host system 202 may be configured to receive wagering information from each associated wagering terminal 100 (wagering terminals connected to the host system may also be referred to as local wagering terminals), through the network interface, as gaming patrons place wagers on a particular event so that it may, for instance, calculate current odds.

A guest system 204 is a system typically located in a facility off-site from where the event on which the gaming patron wishes to place a wager is scheduled to take place, yet is a facility in which other events on which wagers may be placed may occur. For instance, systems located at other horse racing facilities, including, but not limited to, Churchill Downs and Western OTB (Off-Track Betting) would be guest systems 204 in the example wherein the system located at Santa Anita Park is the host system 202. Thus, it will be understood and appreciated by those of ordinary skill in the art that a host system 202 for one event may be a guest system 204 for another event. Each guest system 204 is configured to receive data (e.g., wagering event information) from the host system 202 and communicate such data to at least one wagering terminal 100 associated therewith (wagering terminals connected to a guest system may also be referred to as remote wagering terminals).

Each guest system 204 is in operable communication with at least one hub 206, which is also in operable communication with the host system 202. As such, each guest system 204 is configured to receive data generated by the host system 202 through the hub 206. Thus, the hub 206 may be a computer or concentration of computers that facilitates communication between the host system 202 and the associated guest systems 204. The hub 206 typically has some association with the host system 202 and may be located on-site (e.g., the hub 206 associated with Churchill Downs) or off-site (e.g., the hub 206 associated with Santa Anita Park).

Each guest system 204 may be in operable communication with at least one local system 208 and configured to further transmit all data received from the hub 206 to the associated local system(s) 208. A local system 208 is a system located, for instance, at an off-site betting parlor of the guest system 204 or at another facility having some association with the guest system 204 (e.g., Hollywood Park of Inglewood, Calif. and Hoosier Park of Anderson, Ind. are under common ownership with Churchill Downs of Louisville, Ky. and may be local systems 208 associated therewith). Each local system 208 is configured to transmit data to one or more wagering terminals 100 located within the facility housing the local system 208.

As will be understood and appreciated by those of ordinary skill in the art, wagering terminals 100 may be located not only at the facility housing a local system 208 but also at the facility housing the host system 202 or the facility housing a guest system 204 as well. In the event that a wagering terminal 100 is located at the facility housing the host system 202, the host system 202 also acts as the local system 208 and, thus, the host system 202 may be in operable communication with the wagering terminal 100 and configured to transmit data directly to the wagering terminal 100. Similarly, in the event that a wagering terminal 100 is located at the facility housing a guest system 204, the guest system 204 also acts as the local system 208. In this instance, data generated by the host system 202 may be transmitted to the hub 206, from the hub 206 to the guest system 204, and from the guest system 204 to the wagering terminal 100. Thus, the guest system 204 may be in operable communication with the wagering terminal 100 and configured to transmit data directly thereto. Variations on the delineated operable connections are contemplated to be within the scope hereof.

The following represents an exemplary wagering transaction that may be conducted utilizing the system and many of the features of the present invention. It will be understood that the following is provided to further illustrate the principles of the present invention and is not intended to limit the scope thereof.

With reference to FIGS. 4A-4E, typically, a wagering session is initiated, or an attempt to initiate a wagering session is begun, when an individual (i.e., a potential gaming patron) approaches or passes near a wagering terminal and is detected by the proximity detector associated therewith. More particularly, the transmitter of a wagering terminal emits radiation (e.g., infrared radiation) which is reflected from the potential gaming patron. The reflection is detected by the receiver of the proximity detector. The wagering terminal may typically be located at a racetrack, casino, off-track betting parlor, or other facility offering wagering on a plurality of wagering events including, but not limited to, horse and/or dog races. Upon detection 710 of the reflected radiation, the wagering terminal may initiate a visual and audio attraction sequence 714. The attraction sequences may be, for example, prerecorded sound and video clips designed to attract the potential gaming patron to approach the wagering terminal and initiate a wagering transaction. As previously described, if the proximity detector does not detect a potential gaming patron approaching or passing near the wagering terminal for a predetermined period of time, the wagering terminal may enter a low power consumption mode 716.

The video attraction sequence may include presentation of the first of a plurality of screens required to place a wager at the wagering terminal. From this screen, the gaming patron may be able to navigate through additional screens using the primary touch screen or an external data input device (not shown) such as a keypad and/or mouse.

If the audio and visual attraction sequences are successful in attracting the potential gaming patron, the gaming patron will approach the wagering terminal and touch 718 the predetermined region of the primary touch screen, to begin the wagering transaction. Initially, the gaming patron may be asked 720, both audibly and visually, to select a language preference from a plurality of languages in which subsequent instructions may be offered. The gaming patron then may select 722 a language preference by touching a predetermined area of the primary touch screen. If a language other than the default language in which the instructions are already being given is selected, the audio and visual instructions will change 724 and subsequently be offered in the language selected by the gaming patron.

While all instructions offered by the wagering terminal are available audibly as well as written on the primary display, once the gaming patron is engaged at the wagering terminal, he or she may be presented 726 with the option of silencing the audio presentation of instructions and, accordingly, only receive instructions visually on the primary display. This visual-only presentation will attract less attention from surrounding persons, which may be particularly attractive to novice gaming patrons who may be intimidated by the wagering environment. If the gaming patron selects 728 to receive concurrent audio wagering instructions, the audio instruction will persist for the duration of the wagering transaction and an audio request will accompany each wagering screen and will provide substantially the same information as is presented on the primary display. Alternatively, if the gaming patron selects 730 to receive only visual wagering instructions, the audio presentation of instructions will be silenced for the duration of the wagering transaction.

Next, the gaming patron may be asked 732 from what source funds in support of his or her wager will be provided. The source of funds may be, for instance, currency, voucher, winning ticket, or a previously established wagering account. If the gaming patron indicates that the source of funds will be a previously established wagering account, the gaming patron may subsequently be asked to input 734 a series of identifying criteria using the data input device (e.g., touch screen display, keyboard, or mouse). Identifying criteria may include, for example, an account number and a Personal Identification Number (PIN) or password required to verify the gaming patron's identity. Alternatively, the gaming patron may swipe an account card through the card reader/writer associated with the wagering terminal to facilitate access to the appropriate identity and wagering account information. However, criteria to verify the gaming patron's identity may still be input using the data input device to decrease the incidence of fraud. The user identification units, as described earlier, may also be used for patron identification.

Verification of a previously established wagering account using the identifying criteria is preferably performed by the local system supporting the wagering terminal. Thus, data indicative of the gaming patron's input are transmitted from the wagering terminal to the local system and the local system verifies the information. Once identity is verified, the local system transmits data indicative of the gaming patron's wagering account information to the wagering terminal and information including, but not limited to, the amount available for wagering may be presented 736 on a predetermined area on the primary display.

If the gaming patron does not have a previously established wagering account 738 but desires to establish one, instructions for doing so may be provided. If the gaming patron does not have a previously established wagering account and does not desire to establish one, the gaming patron may provide 740 funds for the current wagering transaction by inserting currency into the currency receiver of the wagering terminal. If the method of payment is currency, voucher, winning/refund ticket, the value of the amount inserted may be read by the appropriate reader means (i.e., the currency receiver or the ticket receiver) and may be subsequently presented on a predetermined area on the primary display.

Where government regulations permit, funds may be provided in support of a wager using a credit card or debit card. In this case, the gaming patron may be prompted 742 to swipe or insert the credit/debit card in the card reader/writer and requested to input specific identifying criteria (e.g., PIN or password), as well as the amount to be wagered, by touching a predetermined area of the primary touch screen. Upon verification of the identifying criteria and confirmation of the amount to be wagered, the amount available to wager may be presented 744 on the primary display. It will be understood and appreciated by those of ordinary skill in the art that funds may similarly be added to a previously established wagering account using the currency receiver and/or card reader/writer.

Upon verification of the identifying criteria by the local system and confirmation of the amount available for wagering, the gaming patron may proceed with the wagering transaction. More particularly, the gaming patron may next be asked 746 to choose the event category on which he or she wishes to place a wager. Event categories may include, for instance, all racing events scheduled to take place at a particular event venue remote from the facility housing the wagering terminal at which the gaming patron is engaged. The gaming patron may select the particular event category on which he or she desires to place a wager by touching 748 a predetermined area on the primary touch screen of the wagering terminal.

Typically, once the event category is selected, communication with the host system is established and data indicative of all available events, which fall within the event category and on which wagers may be placed, may be transmitted from the host system through the network and are presented on the primary display of the wagering terminal. Other information including, but not limited to, the time frame in which wagers on each particular event may be placed, may also be presented. The gaming patron may then be asked 750 to select the particular event on which he or she desires to place a wager.

Once the particular event is selected 752, the host system may transmit data indicative of the types of wagers that may be placed on the event (e.g., win-place-show wagers) and information indicative of the same may be displayed. If desired, additional information regarding the selected event may also be transmitted and displayed including, but not limited to, information about the event participants, each participant's odds to win and which participants are favored to win. Additional handicapping information may also be provided, if desired. As will be understood and appreciated by those of ordinary skill in the art, the volume of information that may be transmitted is limited only by the bandwidth available for transmission. As some of the information is subject to relatively constant modification, data indicative of the information may be transmitted from the host system at a predetermined rate, typically set by the host system, and the primary display of the wagering terminal updated accordingly.

The gaming patron may subsequently be prompted 754 to specify the particular type of wager he or she wishes to place on the selected event within the selected event category and the event participant on which he or she desires the wager to be placed 758. The gaming patron may select (756, 760) the type of wager and participant by touching predetermined areas on the primary touch screen. As the gaming patron may choose to wager less than the amount available in his or her wagering account on a particular transaction, the gaming patron may also be asked 762 to specify the amount he or she desires to wager. The gaming patron may input 764 the amount he or she desires to wager for the selected type of wager by touching a predetermined area on the primary touch screen. By way of example, the gaming patron may choose Participant #1 to Win-Place-Show for a wager of $3.00.

The gaming patron may subsequently be asked 766 to confirm the wager. That is, confirmation may be required of all information indicative of the wagering transaction including, but not limited to, the event category, the particular event within the event category, the event participant on which the wager is placed, the type of wager, and the amount of the wager may be verified by the gaming patron by touching a predetermined area of the primary touch screen. If the gaming patron desires to modify any of the details of the wagering transaction, he or she may do so by selecting 768 a predetermined area on the primary touch screen, which provides access to an editing screen. From the editing screen, the gaming patron may be permitted 770 to change any of the details of the wagering transaction. The details of the wagering transaction, including any modifications thereto, may subsequently be confirmed again 766 by the gaming patron before the gaming patron may proceed with the wagering transaction.

If funds for the wager are provided utilizing a previously established wagering account, data indicative of the wagering account information may be transmitted and processed by the local system supporting the wagering terminal and the gaming patron's wagering account may be reduced by the amount of the wager placed. A new, adjusted balance of remaining funds available to wager may subsequently appear on a predetermined area of the primary display of the wagering terminal. If funds for the wager were provided utilizing a voucher, a winning/refund ticket, or currency, a new adjusted balance of the remaining funds available to wager may be calculated and displayed on a predetermined area of the primary display of the wagering terminal as well.

Upon confirmation 772 by the gaming patron of the wagering transaction details, a ticket illustrating the details of the wagering transaction may subsequently be printed by a high speed thermal ticket printer (not shown) which is internal to the wagering terminal and dispensed 774 from the ticket dispenser. In particular, it is currently preferred that the ticket provide, for example, the identifier associated with the wagering terminal, the date and time at which the wager was placed, the event category, the particular event within the event category on which the wager was placed, the type of wager, the event participant on which the wager was placed and the amount of the wager. A barcode containing validation information may also be printed on the ticket providing a means to validate the ticket using the validation unit of the wagering terminal once the event on which the wager was placed is completed. Preferably, a unique identifying number identifying the wagering transaction is also printed on the ticket. If desired, advertising messages and/or promotions, typically programmed by the local system, may also appear in print on the ticket.

The wagering terminal may subsequently invite 776 the gaming patron to place another wager on the same or a different event. If the gaming patron chooses 778 to place another wager, the wagering series is repeated beginning with prompting 746 the gaming patron to choose the event category on which he or she desires to place a wager. If the gaming patron chooses not to place another wager, the wagering transaction may terminate 779.

Also upon confirmation by the gaming patron of the wagering transaction details, data indicative of the wagering transaction details, as well as additional information including an identifier associated with the wagering terminal on which the wager was placed and the time at which the wager was confirmed, may be transmitted 780 to the local system supporting the wagering terminal. The wagers from all the wagering terminals supported by the local system may be pooled (at predetermined time intervals) and data indicative of the pooled information may be transmitted to the host system. As pooled information is received, the host system may recalculate the odds placed on each event participant and transmit data indicative of the revised odds and any other desired information, to all guest systems and hubs associated therewith, which, in turn, may transmit the data to each associated local system and/or wagering terminal.

The host system may combine 782 all wagers placed at any wagering terminal supported by the network and transmit data indicative of all pertinent information to the hub, guest, and/or local systems. The host system may also calculate 784 current odds placed on each event participant and transmit data indicative of the same to each hub, guest, and/or local system supported by the network at predetermined intervals. This transmission may occur regardless of whether or not any particular wagering terminal has an engaged gaming patron associated therewith. The hub, guest, and/or local systems may transmit 786 this information to each wagering terminal in operable communication therewith at time intervals commensurate with the time intervals at which it receives the information.

At a predetermined time prior to the occurrence of a particular event, the local systems may transmit 788 data to each of the wagering terminals associated therewith indicating that wagers will no longer be accepted for the particular event. The particular event may then be commenced and data indicative of the results thereof and final calculated odds may be transmitted 790 from the host system to the hub, guest, and/or local systems. Data indicating which gaming patrons engaged in a winning wagering transaction, as well as the corresponding amount of their winnings, may also be transmitted from the host system.

If a gaming patron believes that he or she holds a winning ticket, the gaming patron may visit any wagering terminal supported by the network and insert the ticket into the ticket receiver 792. By way of example and not limitation, the ticket receiver may be an optical mark reader, laser scanner, or CCD scanner. In a currently preferred embodiment, the ticket receiver scans the barcode on the ticket and reads the corresponding wagering transaction information. Subsequently, data indicative of the wagering transaction information may be transmitted to the local, guest, or hub, along with a request for validation of a ticket 794. The ticket may be validated by the local, guest, or hub by comparison of the results of the particular event on which the wager was placed stored in the local, guest, or hub with the wagering transaction information stored in the barcode on the ticket 796. If the ticket cannot be validated, instructions are transmitted to the wagering terminal from the local, guest, or hub instructing the gaming patron to contact a teller for verification 800.

As part of the verification process, the local, guest, or hub may also verify that the date of validation is within a preauthorized date range during which the ticket may be validated at the wagering terminal. If the date of validation is outside of the preauthorized date range, a message may be sent to the wagering terminal and displayed on the primary display instructing the gaming patron on how to validate the ticket. For instance, the message may indicate that the date on the ticket is out of the preauthorized date range for validation and instruct the gaming patron to contact the teller or cashier for validation.

If the ticket is within the preauthorized date range for validation, and the ticket is determined to be a winning ticket, the local, guest, or hub supporting the wagering terminal may calculate the amount won based on the official price declared by the host system. Alternatively, if such information had previously been calculated by the host system, the information may be accessed by the local, guest, or hub. Subsequently, the local, guest, or hub may transmit data indicative of the winning information to the wagering terminal.

The wagering terminal may subsequently present information on the primary display by causing a screen to appear indicating that the gaming patron has won, and an amount won 798. The gaming patron may subsequently be asked if he or she desires to apply the winnings of the inserted ticket to another wager, or apply the winnings to their wagering account 802. If the gaming patron chooses to place another wager using the winnings from a ticket 804, the wagering series is repeated beginning with prompting the gaming patron to choose the event category on which he or she desires to place a wager 806. If the gaming patron chooses to apply the winnings to his or her pre-established wagering account 808, the wagering terminal may return to a prompt wherein the gaming patron is asked to enter a series of identifying criteria such as an account number and a PIN or password required to access the wagering account 810. Upon verification of the account wagering information, the balance in the account may be updated by the local system supporting the wagering terminal and displayed on a primary display 812. The gaming patron may then be asked to swipe his or her account card through the card reader/writer so that the information stored on the card may be updated. However, if the account card stores only identifying information, or if the card reader/writer supports insertion of the account card that remains therein until completion of the wagering transaction, such action would be unnecessary. If the gaming patron does not have a previously established wagering account but desires to establish one and apply the amount of the winnings thereto, instructions to set up a wagering account may be provided at this time.

The gaming patron may choose to receive the winnings in the form of a cash voucher from the wagering terminal 814. If the gaming patron chooses to receive the winnings by way of voucher or wagering slip, the appropriate medium may be printed and dispensed from the ticket dispenser 816.

Once payment has been tendered, the local, guest, or hub subsequently records the unique identifier for the ticket placing it on validated status and indicating that appropriate winnings have been dispensed. Accordingly, the ticket is thereby invalidated for security purposes.

Subsequently, the wagering terminal may return to a prompt wherein the gaming patron is asked on which event he or she desires to place a wager and an attempt may be made to initiate placement of another wager 818.

Upon cessation of all wagering transactions by the gaming patron, he or she will begin to leave the area in proximity to the wagering terminal. As the gaming patron leaves the area, the proximity detector may transmit a signal to the wagering terminal to verify that all wagering transactions have been ceased, no information personal to the gaming patron is still displayed on the primary display and that an unclaimed wagering balance or a card such as a credit card, account card, or the like has not been left in the wagering terminal 820. If nothing is detected, the wagering terminal may reset itself, as more fully described below.

If, however, something amiss is detected (e.g., if a visible wagering account balance is still displayed on the primary display, a debit or credit card is left in the card reader/writer, or a printed ticket in the ticket dispenser is detected), the proximity detector may cause an audible message to be broadcast through the speaker assembly that instructs the gaming patron as to the appropriate corrective action 822. The gaming patron may subsequently return to the wagering terminal 824, review a simultaneously displayed visual message concerning the corrective action necessary, and perform the recommended corrective action. The gaming patron may then leave the area in proximity to the wagering terminal whereby the area may again be checked for anything that may be amiss. If nothing is detected, the wagering terminal may reset itself 826.

Once the gaming patron has left the area in proximity to the wagering terminal, and all proximity checks have been completed, it may be desirable for the wagering terminal to reset itself to a logical starting point for a subsequent user. That is, it is desirable to terminate the wagering transaction and return the wagering terminal to a predetermined idle state in which the wagering terminal is rendered prepared for subsequent users. For instance, the wagering terminal may be reset, returning to a home page. If desired, the wagering terminal may also be reset by the gaming patron when he or she desires to end the current wagering session, for instance, by the gaming patron touching a predetermined location on the primary touch screen, which may cause the wagering terminal to be reset. As the wagering terminal is reset, audio and visual attraction sequences may be initiated, if desired.

The present invention has been described in relation to particular embodiments that are intended in all respects to be illustrative rather than restrictive. It is to be understood that the invention defined by the appended claims is not to be limited by particular details set forth in the above description and that alternative embodiments will become apparent to those of ordinary skill in the art to which the present invention pertains without departing from the spirit and scope thereof. For instance, the wagering terminal may provide the gaming patron with the option of responding to instruction audibly using voice recognition technology. Further, types of proximity detection technology other than infrared technology may be utilized including, but not limited to ultrasonic, radio frequency and near field imaging technology.

What is claimed is:

1. A method for engaging in a wagering transaction, comprising:

providing a wagering terminal selectively configurable for one of a self-service mode and a teller-assisted mode, the wagering terminal comprising a processor, a primary display configured to pivot on a hinge assembly from a pivotally closed position to face a back side of the wagering terminal or pivotally open position to face a front side of the wagering terminal, a secondary display configured to face the front side, and a teller input device configured to face the back side, the primary display comprising an electronic display operably coupled to the processor and physically attached to the wagering terminal by the hinge assembly;

configuring the wagering terminal in the self-service mode by utilizing the hinge assembly to pivot the primary display to the pivotally open position to face a patron perspective on the front side, the self-service mode configured for enabling a gaming patron to place a wager on the wagering terminal without assistance from a teller; and engaging in the wagering transaction at the wagering terminal by utilizing the processor to present wagering transaction information including visual messages on the primary display, the visual messages configured for prompting the gaming patron for information pertinent to placing a wager; and presenting at least some of the wagering transaction information on the secondary display.

2. The method of claim 1, wherein configuring the wagering terminal further comprises configuring the wagering terminal in at least one operational environment selected from the group consisting of a pari-mutuel wagering environment and a lottery ticket sales environment.

3. The method of claim 1, further comprising receiving input related to the wagering transaction from the gaming patron on the primary display configured as a touch screen.

4. The method of claim 1, further comprising:

detecting an event of interest with an image capture unit on the wagering terminal;

generating a capture event notification to the image capture unit temporally correlated to the event of interest;

capturing at least one image in response to the event of interest; and storing the at least one image on a computer readable medium on the wagering terminal.

5. The method of claim 4, further comprising transmitting the at least one image to a remote device.

6. The method of claim 4, wherein capturing the at least one image comprises capturing a plurality of images, relating the plurality of images temporally to form a series of frames over a predetermined time window, each frame of the series of frames separated in time by a time period defined by at least one frame rate.

7. The method of claim 6, further comprising continually capturing the plurality of images until receiving the capture event notification indicating a stop of capturing the plurality of images after a predetermined time interval.

8. The method of claim 1, further comprising:

enabling a proximity detector on the wagering terminal to detect the presence of the gaming patron in an area of proximity to the wagering terminal;

enabling the primary display to display at least one visual message upon detection of the presence of the gaming patron in proximity to the wagering terminal.

9. The method of claim 8, further comprising facilitating a speaker assembly on the wagering terminal to broadcast at least one audio message upon detection of the presence of the gaming patron in proximity to the wagering terminal.

10. The method of claim 9, further comprising enabling the proximity detector to detect the gaming patron leaving the area of proximity to the wagering terminal and to initiate a check of the area in proximity to the wagering terminal for at least one predefined condition.

11. The method of claim 10, wherein if the proximity detector detects the at least one predefined condition, a corrective action audio message is broadcast through the speaker assembly and a corrective action visual message is displayed on the primary display.

12. A method of engaging in a wagering transaction, comprising:

providing a wagering terminal selectively configurable for one of a self-service mode and a teller-assisted mode, the wagering terminal comprising a processor, a primary display comprising an electronic display operably coupled to the processor, physically attached the wagering terminal by a hinge assembly, and configured to pivot on the hinge assembly from a pivotally closed position to face a back side of the wagering terminal or pivotally open position to face a front side of the wagering terminal, a secondary display configured to face the back side, and a teller input device configured to face the back side;

configuring the wagering terminal in the teller-assisted mode by utilizing the hinge assembly pivot the primary display to the pivotally closed position to face a teller perspective on the back side, the teller-assisted mode configured for enabling a teller to place a wager on the wagering terminal; and engaging in the wagering transaction at the wagering terminal by utilizing the processor to present wagering transaction information including visual messages displayed on the primary display, the visual messages configured for prompting the teller to input information pertinent to placing a wager; and presenting at least some of the wagering transaction information on the secondary display.

13. The method of claim 12, wherein configuring the wagering terminal further comprises configuring the wagering terminal in at least one operational environment selected from the group consisting of a pari-mutuel wagering environment and a lottery ticket sales environment.

14. The method of claim 12, further comprising engaging in a user authentication process comprising prompting the teller, to verify the teller's identity by submitting to a user identification process on a user identification unit on the wagering terminal.

15. The method of claim 14, wherein submitting to the user identification process comprises placing a finger on a fingerprint reader configured as the user identification unit.

16. The method of claim 15, wherein submitting to the user identification process further comprises entering a secondary identifier on an input device of the wagering terminal.

17. The method of claim 14, further comprising enabling protected features on the wagering terminal if the user authentication process is successful.

18. The method of claim 12, further comprising receiving input related to the wagering transaction from the teller on at least one of the teller input device and the primary display configured as a touch screen.

* * * * *

UNITED STATES PATENT AND TRADEMARK OFFICE

CERTIFICATE OF CORRECTION

PATENT NO. : 8,591,318 B2
APPLICATION NO. : 12/778814
DATED : November 26, 2013
INVENTOR(S) : Scott B. Pfennighausen et al.

It is certified that error appears in the above-identified patent and that said Letters Patent is hereby corrected as shown below:

On the title page:
In ITEM (56) References Cited

PAGE 3, COLUMN 1, LINE 20, change “Le May” to --LeMay--

Signed and Sealed this
Fifteenth Day of September, 2015

Michelle K. Lee
*Director of the United States Patent and Trademark Office*